June 2, 1931.  A. F. RENKEN  1,808,006

GOPHER TRAP

Filed Oct. 14, 1929

Inventor
ANTON F. RENKEN

By Emil F. Lange
Attorney

Patented June 2, 1931

1,808,006

UNITED STATES PATENT OFFICE

ANTON F. RENKEN, OF CRETE, NEBRASKA

GOPHER TRAP

Application filed October 14, 1929. Serial No. 399,605.

My invention relates to gopher traps and it has for its object the provision of a gopher trap which may be more readily set than the prior gopher traps and which is more certain in its action in catching the gopher.

One of my objects is the provision of a gopher trap having two body members which are pivotally connected together at a point between the two body members so that the upper jaw member will swing through a smaller arc to thus reduce the time of closing of the trap.

Another object is the provision of a pivotal connection between the two jaw members which is so positioned that the upper jaw member will strike the animal at an inclination such as to force the animal forwardly between the jaws of the trap.

Another object which I have in mind is the provision of a handle member attached to the lower jaw member at an inclination thereto so that the trap may readily be inserted in a gopher hole and so that it may readily be set after it is in position in the gopher hole.

Having in view these objects and others which will be pointed out in the following description, I will now refer to the drawings, in which Figure 1 is a plan view of my gopher trap.

The gopher trap, like many of the prior animal traps, consists of two pivotally connected jaws for engaging the animal. In the present instance the lower jaw member 10 is U shaped and its free extremities are connected by means of a U shaped strap 11. The U shaped jaw member 10 is relatively narrow in width and the U shaped strap 11 has a horizontal portion passing underneath the free ends of the jaw member 10 and has two vertical portions which are riveted or otherwise secured to the arms of the jaw member 10. The handle member 12 is also made in U form and it is secured to the upright portions of the strap 11 at an inclination of about thirty degrees. The purpose of this inclination will be more fully explained in connection with the description of the mode of operation of the trap.

Figure 1:
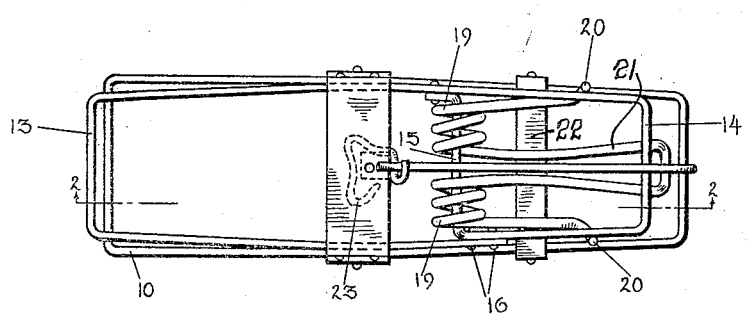

The upper jaw member 13 with its handle portion 14 is formed from a continuous strap of metal. As shown in Figure 1, this strap is bent transversely to form a spring support 15 from whence it is bent first rearwardly, then transversely to form the handle portion 14, then forwardly where it is secured to the angled end portion of the spring support 15 and thence forwardly and transversely to form the jaw member 13 and thence rearwardly where it is secured at 16 to that portion of the strap between the portions 14 and 15. The two parallel portions of this strap are united by means of an inverted U shaped strap 17, the horizontal portion of which overlies the parallel portions of the strap. The vertical portions of the strap 17 are rigidly secured to the parallel portions of the strap which constitutes the upper jaw and its handle member. The straps 11 and 17 are pivotally connected together at 18. Since the jaw 13 constitutes the hammer which acts against the anvil 10 of the trap, it is desirable that the jaw 13 move through a relatively small arc. It is also desirable that the jaw 13 have a downward and rearward movement so that if the animal should happen to be struck too far forwardly, the action of the jaw will be such as to draw the animal between the two jaws. The position of the pivot 18 is such as to materially decrease the arc of the movement of the jaw 13 and it is also such that the movement of the jaw 13 in closing is rearward as well as downward.

Figure 3:
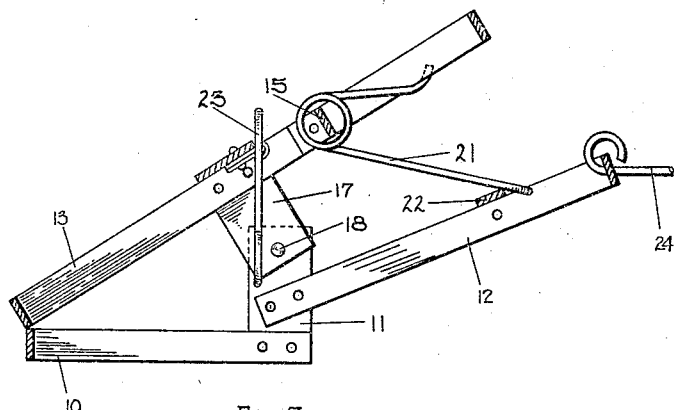
Figure 3 is a view similar to Figure 2 but showing the gopher trap before it has been set.
Figure 2:
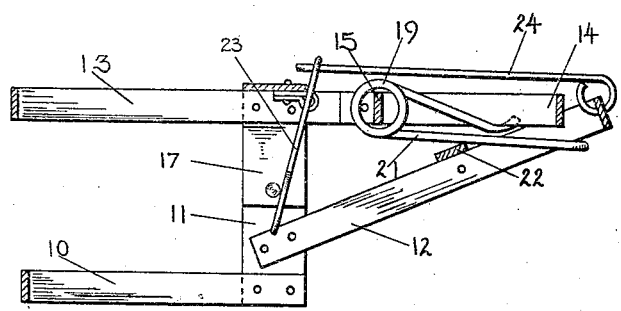
Figure 2 is a sectional view on the line 2—2 of Figure 1 showing the gopher trap in its set position.

The jaws are normally urged toward their closed position by means of a spring which comprises the double coil 19 and which is anchored against the two handle members so as to spread them apart. The free ends 20 of the spring are anchored against the lower edges of the parallel portions of the handle member 14, the coil being supported on the transverse spring support 15. The middle looped portion 21 of the spring rests on the brace 22 connecting the parallel portions of the handle member 12. The action of the spring is to hold the members in the position shown in Figure 3 with the handle portions spread apart and with the jaw members close together.

The trigger is shown at 23 and it has the form best shown in Figure 1. It is pivotally connected to the horizontal portion of the strap 17 and it is provided with an open loop at its upper extremity. Secured to the transverse portion of the handle member 12 is a rod 24 which is adapted to engage in the opening of the trigger 23 as shown in Figure 1. The rod 24 is adapted to pass over the handle member 14 to maintain the handle members 12 and 14 in close proximity. At such times the jaw members 10 and 13 are maintained in their spread apart relation and the trigger 23 hangs downwardly with a slight forward inclination. The trap is sprung by the animal entering between the jaws 10 and 13 and coming in contact with the trigger 23.

The inclined position of the handle member 12 has an important function when setting the trap. The gopher burrow is first opened and the trap must be set in such position that the animal will get between the jaws when it attempts to close up the opening to the burrow. If the trap is first set it is a very difficult matter to thrust it into the gopher burrow without springing the trap due to the fact that the soil is dislodged by the trap and it usually strikes the trigger in falling. For this reason the trap is best set after it is in position in the burrow. The wedge shaped relation between the two jaw members facilitates the ready introduction of the trap into the burrow. If, however, the two jaw members were continuous with their handle members it would result in too great a spread between the handle members. The worst drawback, however, would be that the lower jaw member 10 with its other member would rest against the bottom of the burrow which would make it difficult to insert the trap as far into the burrow as is desirable and it would make it difficult to grasp the lower handle member so as to force the two handle members against each other. These difficulties are, however, entirely obviated by the fixed inclined position of the handle member 12 with reference to the jaw member 10. The entire trap may be forced into the gopher burrow as far as is desired and both handle members will be within easy reach of the trapper so that the trap may readily be set after it is in the burrow.

Having thus described my invention in such full, clear, and exact terms that its construction and operation will be readily understood by others skilled in the art to which it pertains, what I claim as new and desire to secure by Letters Patent of the United States is:

1. An animal trap including a lower jaw member, an arm projecting from said lower jaw member at the rear extremity thereof, a handle member secured to said arm at an intermediate point thereof and positioned angularly with respect to said lower jaw member, an upper jaw and handle member having an arm projecting therefrom at an intermediate point thereof, a pivotal connection between said two arms, a member for holding said jaws in open position, and resilient means for closing said jaws when said holding member is released.

2. An animal trap including a U shaped lower jaw member, a pair of arms projecting from said lower jaw member at the rear extremities thereof, a U shaped handle member secured at its extremities to said arms at points intermediate the extremities thereof and positioned angularly with respect to said lower jaw member, an upper four-sided jaw and handle member having arm projecting from the lateral sides, pivotal connections between the arms of said upper and lower jaw members, a member for holding said jaws in open position, and resilient means for closing said jaws when said holding member is released.

3. An animal trap including a U shaped lower jaw member, a pair of arms projecting from said lower jaw member at the rear extremities thereof, a U shaped handle member secured at its extremities to said arms at points intermediate the extremities thereof and positioned angularly with respect to said lower jaw member, an upper four-sided jaw and handle member having arms projecting from the lateral sides, pivotal connections between the arms of said upper and lower jaw members, a member for holding said jaws in open position, and means for closing said jaws when said holding member is released, said jaw closing means comprising a coiled spring anchored to said upper jaw and handle member and having an end portion slidably held against a fixed part of said U shaped handle member.

In testimony whereof I affix my signature.

ANTON F. RENKEN.